United States Patent [19]

Hecht et al.

[11] 4,016,394
[45] Apr. 5, 1977

[54] PRODUCTION OF LONGITUDINALLY WELDED PIPE

[75] Inventors: Meinhard Hecht, Hasbergen; Herbert Kubiak, Misburg, both of Germany

[73] Assignee: Kabel-und Metallwerke Gutehoffnungshutte Aktiengesellschaft, Germany

[22] Filed: Feb. 10, 1975

[21] Appl. No.: 548,616

[30] Foreign Application Priority Data

Feb. 8, 1974 Germany ............................ 2406000

[52] U.S. Cl. .................................. 219/61; 219/105; 219/118; 228/206
[51] Int. Cl.² ....................................... B23K 31/06
[58] Field of Search ................... 219/61, 105, 118; 252/81, 178; 228/206

[56] References Cited

UNITED STATES PATENTS

| | | | |
|---|---|---|---|
| 2,796,508 | 6/1957 | Holman et al. | 219/61 |
| 2,892,738 | 6/1959 | Dobratz | 252/81 X |
| 2,936,289 | 5/1960 | Harshman et al. | 252/178 X |
| 3,280,294 | 10/1966 | Polizzano | 219/61 X |
| 3,764,548 | 10/1973 | Redmore | 252/178 X |

OTHER PUBLICATIONS

*The Condensed Chemical Dictionary*, fourth edition, Turner ed., Reinhold Publishing Corporation, New York, copyright 1950.

Primary Examiner—J. V. Truhe
Assistant Examiner—N. D. Herkamp
Attorney, Agent, or Firm—Marn & Jangarathis

[57] ABSTRACT

In the production of longitudinally welded pipes, the metal strip is treated with a chemical deoxidizing agent, such as a hydrazine compound, to remove oxides from at least the strip edges, prior to arc welding, to provide an improved weld.

7 Claims, 1 Drawing Figure

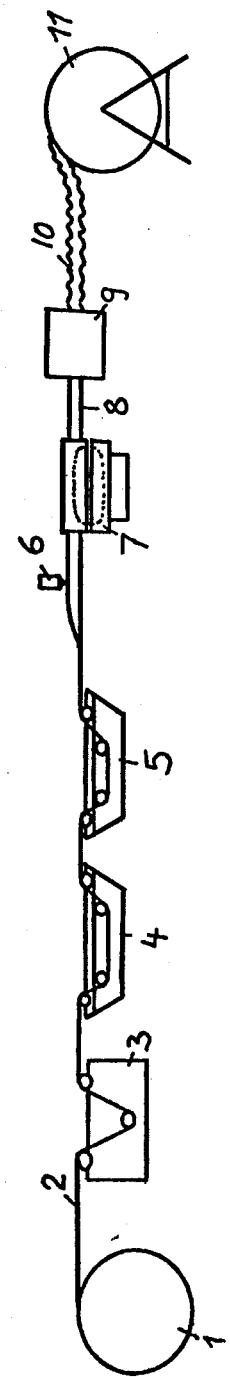

PRODUCTION OF LONGITUDINALLY WELDED PIPE

The present invention relates to the production of longitudinally welded pipes, and more particularly to improvements in the production of longitudinally welded pipes by means of arc welding.

Longitudinally welded pipes may be used as cable sheathings, coverings for metal wires, or cables and are made on so-called longitudinal seam welding machines, wherein the strip edges of a longitudinally running metal strip are welded together by means of arc welding under a cover of buffer gas. Normally this type of welding does not create any problems; however, problems may arise if the metal is not completely free from oxides in the area of the welding range, as a result of the welding arc becoming unsteady, thereby causing welding errors. The pre-making of, for example, copper strips with substantially oxide free upper surfaces is possible; however, as a result of weather influence and/or long storage times, oxide can form on the surface of the copper strips, and this oxide formation can have an adverse effect on longitudinal welding by an arc welding technique. Accordingly, the principle object of this invention is to provide for the production of error free longitudinal welded seams by arc welding.

In accordance with the present invention, the metal strip, prior to being arc welded to produce a longitudinally welded seam, is chemically cleaned of oxide, thereby insuring that the strip, which is subjected to arc welding, is essentially free of oxide.

The chemical deoxidizing agent is preferably hydrazine, a hydrazine salt or a hydrazine containing compound; such as an alkyl hydrazine, hereinafter generically referred to as hydrazine compounds, with such term including hydrazine and its salts. It is to be understood, however, that other chemical deoxidizing agents, which do not adversely affect the metal, can also be employed. The hydrazine compound, which can be used in concentrated or appropriately diluted form, is preferred as a result of its ability to rapidly and efficiently effect deoxidation. In particular, when using strips made of copper or a copper alloy, a treatment time of less than one second is required to completely remove the oxides.

It is particularly advantageous to first degrease the metal strip and then to immerse it into a bath containing hydrazine, followed by forming into a pipe and arc welding. As a result of the degreasing step, the deoxidation process with hydrazine is substantially simplified, while the neutralization washing after immersing the strip of material into the hydrazine containing bath, prevents the penetration of the hydrazine into the welding area. If strips of steel or aluminum are used which are heavily oxidized, it is advantageous to mechanically remove the oxide from the strip edges subsequent to or during the treatment with the chemical deoxidizing agent. It has been shown that a brushing method is most advantageous. When heavily oxidized surfaces have to be cleaned, it is recommended to spray hydrazine on the strip edges and then clean the same with rotating brushes which are also sprayed with or immersed into the hydrazine.

For carrying out the method, a device is used which in series contains a hydrazine bath, a water bath, a pipe forming means and an arc welding means. A strip degreasing means may be provided in front of the hydrazine bath.

The invention will be further described with respect to the drawing wherein:

The drawing is a simplified schematic representation of an embodiment of the invention.

Referring to the drawing, a metal strip 2, preferably a copper strip, is continuously withdrawn from supply roll 1 and guided to a degreasing means 3. In the degreasing means 3, the metal strip 2 is degreased by means of an organic solvent, such as, for example, tri- or perchloroethylene. Subsequent to the degreasing, the metal strip 2 is moved to a bath 4 containing a chemical deoxidant, such as, hydrazine bromide, and immersed into the liquid to remove accumulated oxide from the surface thereof. The deoxidation agent residue which clings to the metal strip 2 is removed in a subsequent washing or neutralization bath 5, which may be alcohol or water. Subsequently, the treated strip of metal 2 is moved to a pipe forming machine (not shown) of a type known in the art, wherein the strip is formed into a pipe having a longitudinal slot. The formed pipe is then welded under buffer gas by means of arc welding device 6, to produce a pipe with a longitudinally welded seam. A so-called drawing clamp tongue 7, as described, for example, in U.S. Pat. No. 3,280,294, is provided subsequent to welding means 6, which removes the welded pipe 8 and moves it to a corrugation means 9. The corrugated pipe 10 is then wound onto a cable drum 11.

When using metal strips made of steel or aluminum, it is avantageous to clean the edge portions of the strip with brushes, and such cleaning can be accomplished by providing brushes (not shown) within bath 4. The hydrazine or hydrazine compound may be in concentrated or diluted form. As a diluting agent water and alcohol are recommended.

In accordance with the present invention, a metal strip which is heavily oxidized can be subsequently formed into pipes having a perfectly welded longitudinal seam. When strips are made of copper or an alloy thereof immersion of less than one second into the bath suffices to completely remove the oxide.

The inventive method is particularly advantageous when making thin walled pipes, that is, having a wall thickness of less than 0.2 mm. As a result of the metal being free of oxide, the welding arc is stable, thereby providing improved welding. In addition, no oxide residue is present in the welded seam.

Numerous modifications and variations of the present invention are possible in light of the above teachings and, therefore, within the scope of the appended claims the invention may be practiced otherwise than as particularly described.

What is claimed is:

1. A process for producing longitudinally welded pipe from a metal strip wherein the metal is selected from the group consisting of copper and its alloys, comprising:
   cleaning oxide from at least the edges of the metal strip with a hydrazine compound; washing the strip to remove remaining hydrazine compound; forming the strip into a pipe; are arc welding the formed pipe to produce the longitudinally welded pipe.

2. The process of claim 1 wherein the strip is degreased prior to cleaning oxide therefrom.

3. The process of claim 2 wherein at least the strip edge portions are mechanically cleaned.

4. The process of claim 3 wherein the strip edges are mechanically cleaned by brushing while cleaning the oxide with the hydrazine compound.

5. The process of claim 1 wherein the longitudinally welded pipe has a wall thickness of less than 0.2 mm.

6. The process of claim 5 wherein the longitudinally welded pipe is a copper pipe.

7. The process of claim 6 wherein the hydrazine compound is a hydrazine salt.

* * * * *

UNITED STATES PATENT OFFICE
CERTIFICATE OF CORRECTION

Patent No. 4,016,394　　　　　　　Dated April 5, 1977

Inventor(s) Meinhard Hecht and Herbert Kubiak

It is certified that error appears in the above-identified patent and that said Letters Patent are hereby corrected as shown below:

IN THE CLAIMS:

Claim 1, Column 2, line 63, "are" should be -- and --.

Signed and Sealed this

Fourteenth Day of June 1977

[SEAL]

Attest:

RUTH C. MASON　　　　　　　C. MARSHALL DANN
*Attesting Officer*　　　　　　*Commissioner of Patents and Trademarks*